J. K. DELANO.
STARTING AND LIGHTING SYSTEM FOR MOTOR VEHICLES.
APPLICATION FILED MAR. 11, 1918.

1,419,825. Patented June 13, 1922.
5 SHEETS—SHEET 1.

Inventor
James K. Delano,
By
his Attorney

Witness
Chas. L. Griesbauer.

INVENTOR
James K. Delano,
By
his Attorney

J. K. DELANO.
STARTING AND LIGHTING SYSTEM FOR MOTOR VEHICLES.
APPLICATION FILED MAR. 11, 1918.
1,419,825.
Patented June 13, 1922.
5 SHEETS—SHEET 4.
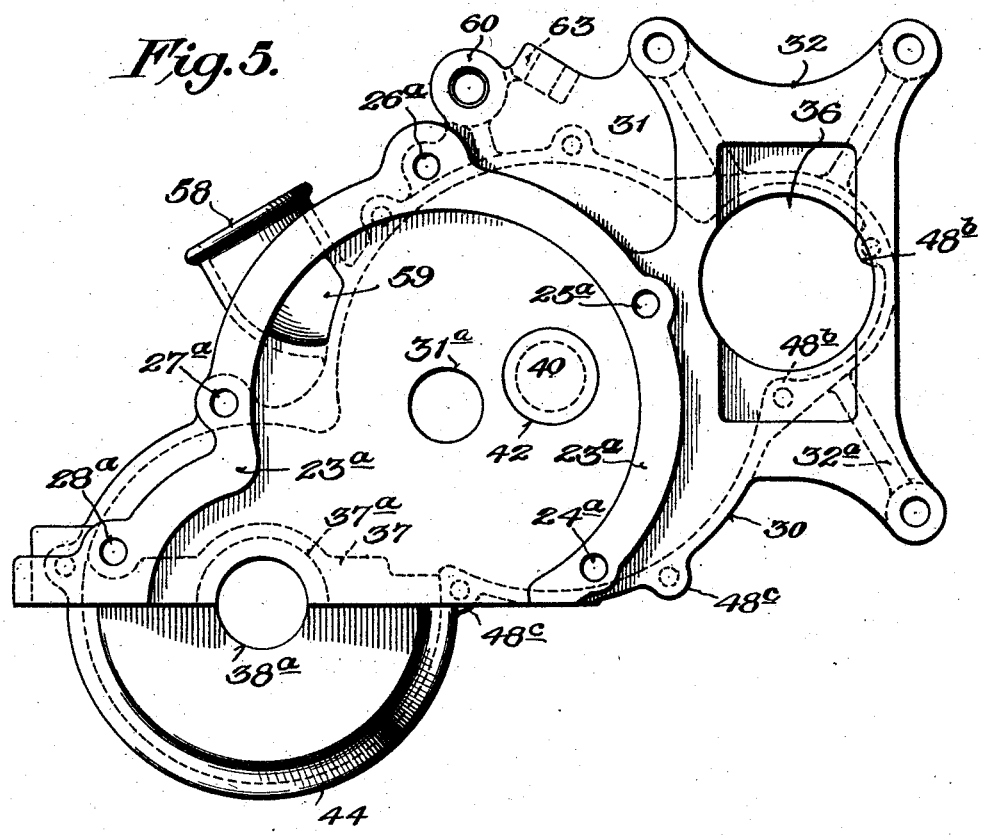
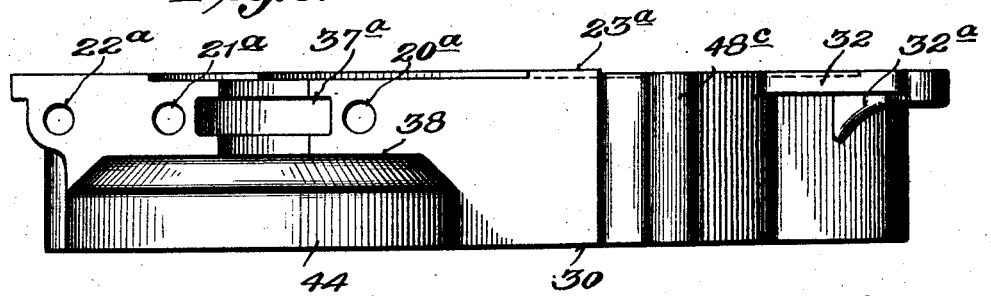

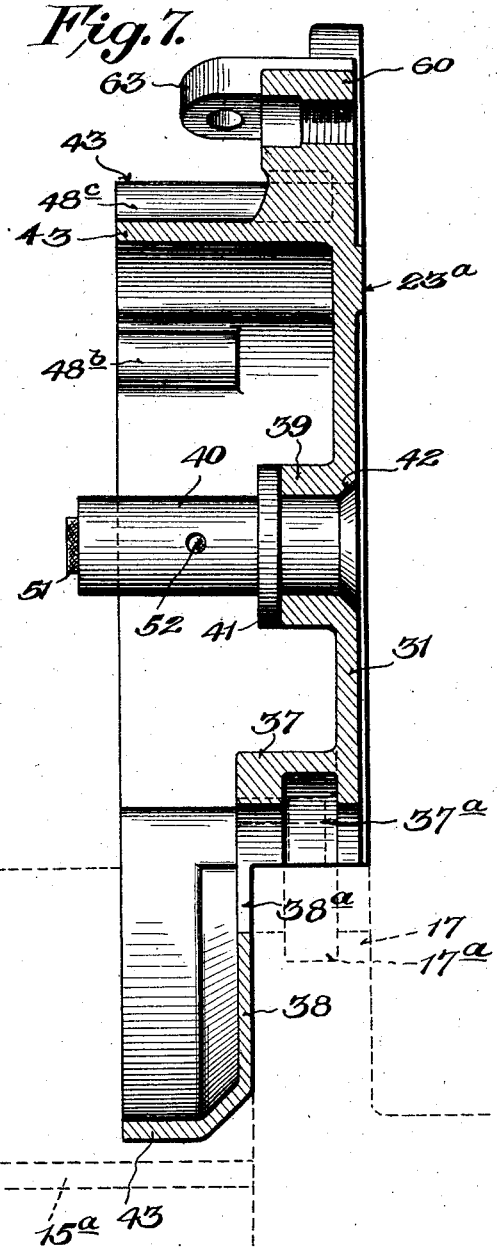

UNITED STATES PATENT OFFICE.

JAMES K. DELANO, OF NEW YORK, N. Y.

STARTING AND LIGHTING SYSTEM FOR MOTOR VEHICLES.

1,419,825. Specification of Letters Patent. Patented June 13, 1922.

Application filed March 11, 1918. Serial No. 221,697.

*To all whom it may concern:*

Be it known that I, JAMES K. DELANO, a citizen of the United States, residing at New York, in the county of New York and State of New York, have invented certain new and useful Improvements in Starting and Lighting Systems for Motor Vehicles; and I do hereby declare the following to be a full, clear, and exact description of the invention, such as will enable others skilled in the art to which it appertains to make and use the same.

This invention relates to starting and lighting systems for motor vehicles. More particularly it relates to a construction whereby a power device, such as dynamo electric means for starting, lighting, etc., may be mounted on motor vehicles propelled by internal combustion engines but not specially designed by the manufacturer to accommodate an auxiliary power device, such as a starting motor or lighting generator geared to the engine crank shaft. It is a principal object of the invention to provide a construction which enables such power device to be readily installed on motor vehicles of the general character described without requiring the exercise of a high degree of mechanical skill, and without necessitating extensive alterations in the construction or arrangement of the vehicle or engine parts. More specifically, it is an object of the invention to enable starting and lighting apparatus to be conveniently and readily installed on motor vehicles of the well known "Ford" type, this installation to be effected by a simple alteration of the time gear housing, with very little change otherwise in the standard Ford construction and equipment.

The invention is not necessarily limited in its broader aspects to starting and lighting installations for Ford cars, its general principles being applicable to other cars in some measure. Nor is the invention limited to the modification or rearrangement of constructions already manufactured, but on the contrary it may advantageously be embodied in car constructions in the course of manufacture as an essential feature of design and equipment. At present, however, the invention is particularly useful in adapting the standard Ford construction to accommodate a starting and lighting system. Accordingly the principles of the invention will be hereinafter explained in connection with a specific embodiment thereof as applied to a Ford installation, it being understood that such embodiment is merely illustrative and is not restrictive.

The well known Ford construction is not designed to accommodate a starting motor, the standard equipment providing only for hand cranking. Moreover, by reason of the peculiar forward extension of the lower part of the engine housing and supporting frame, and the slight surplus space in the engine hood, it is very difficult to mount a starting motor on the car without resorting to more or less complicated modifications of construction and awkward arrangement of parts which are not only impractical and unsatisfactory from a mechanical standpoint, but which also involve considerable expense both in the first cost and upkeep. Various attempts have been made to overcome these difficulties, but the various solutions of the problem heretofore proposed have all proved more or less objectionable for one reason or another.

According to the present invention, the objects above stated, as well as others which will be apparent to those skilled in the art from the description hereinafter given, are accomplished in a very simple and effective manner, the resultant installation being characterized by compactness, small weight, and high mechanical and electrical efficiency, and the original construction being altered but very little and being utilized to the fullest extent practicable. Briefly described, the invention comprises replacing a removable part of the original housing of the time gears driving the cam shaft from the engine crank shaft, in certain motor vehicles whose construction will permit, by an attachment, most desirably unitary in character, which not only performs the function of the replaced part in covering the valve timing gears, but which also provides a support or mounting for dynamo electric means for starting, or lighting, or both, and accommodates a train of gears affording driving connection between the engine crank shaft and the armature shaft or shafts of the dynamo electric means, said means being most desirably mounted adjacent the engine housing on the side opposite to the driver's seat. This attachment advantageously takes the form of a combined time gear cover plate and drive gear housing, including an extension to which said dynamo electric means is rigidly secured. In the best embodiment of the invention, this combined time gear cover and drive gear housing, apart from the front cover with which it is best provided, is a one-piece casting, in which are provided bolt holes adapted to register with holes already tapped in that part of the time gear housing or casing to which the replaced part was originally bolted. In applying the principles of the invention to the Ford construction, the removable part replaced by the attachment or casting of the present invention is the removable cover for the time gears, which cover also carries certain other parts. The attachment substituted for this time gear cover therefore most desirably embodies such other parts so far as is desirable or convenient, in part without change, and in part with such slight rearrangement as may be necessitated by the extension of the new plate supporting the dynamo electric means or by other considerations.

In order to enable those skilled in the art to practice the invention, a typical embodiment of the same as applied to a standard Ford automobile construction is illustrated in the accompanying drawings forming a part hereof, and is described hereinafter in detail, the characteristic features of the invention being set forth more particularly in the appended claims. In the drawings, Fig. 1 is a front elevation of the installation, parts being shown broken away and in section;

Fig. 5 is a rear view of the combined cover plate and drive train housing;

Fig. 6 illustrates the construction of Fig. 5, viewed from below;

Fig. 7 is a developed section on the irregular line 7—7 of Fig. 3, the gears being omitted; and Fig. 8 is a similar section on the line 8—8 of Fig. 3.

Figure 1:
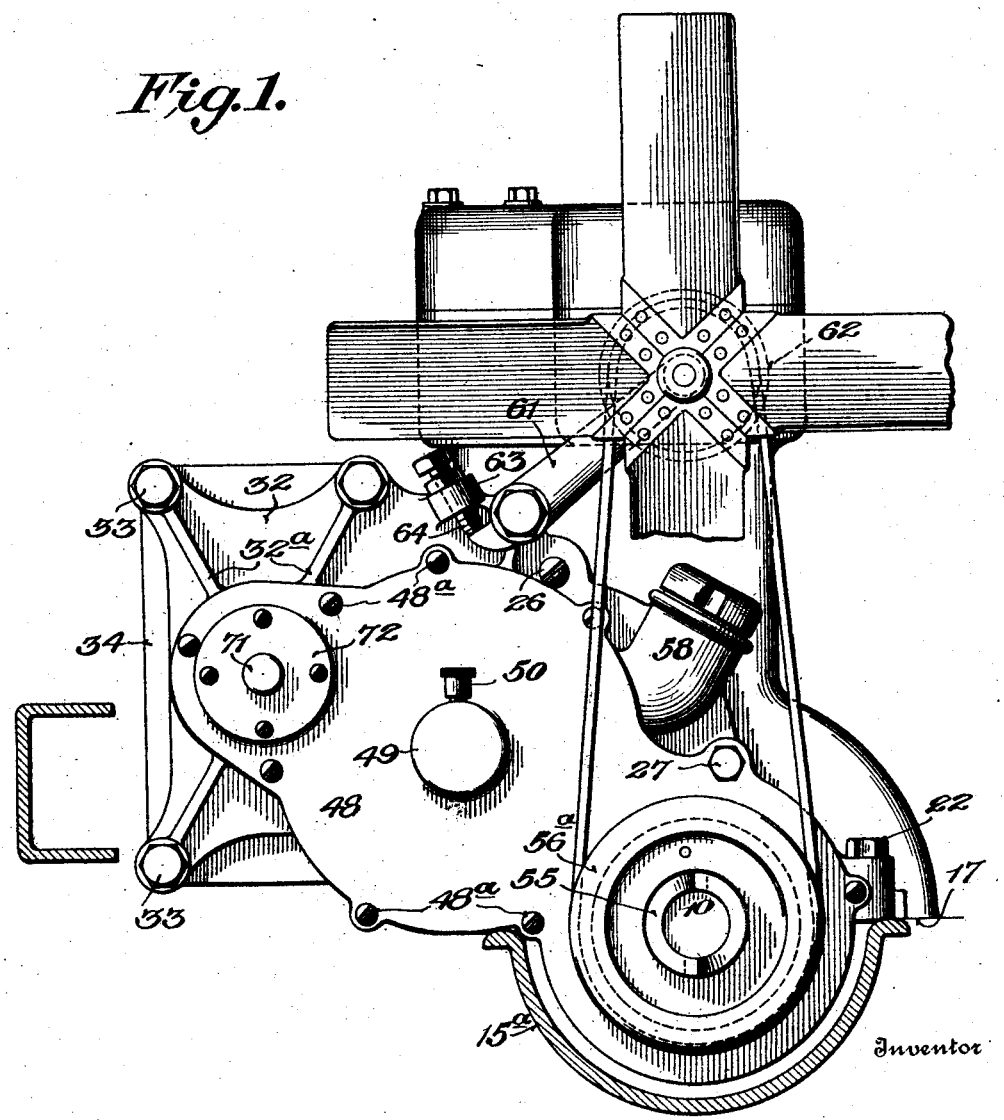
Figure 2:
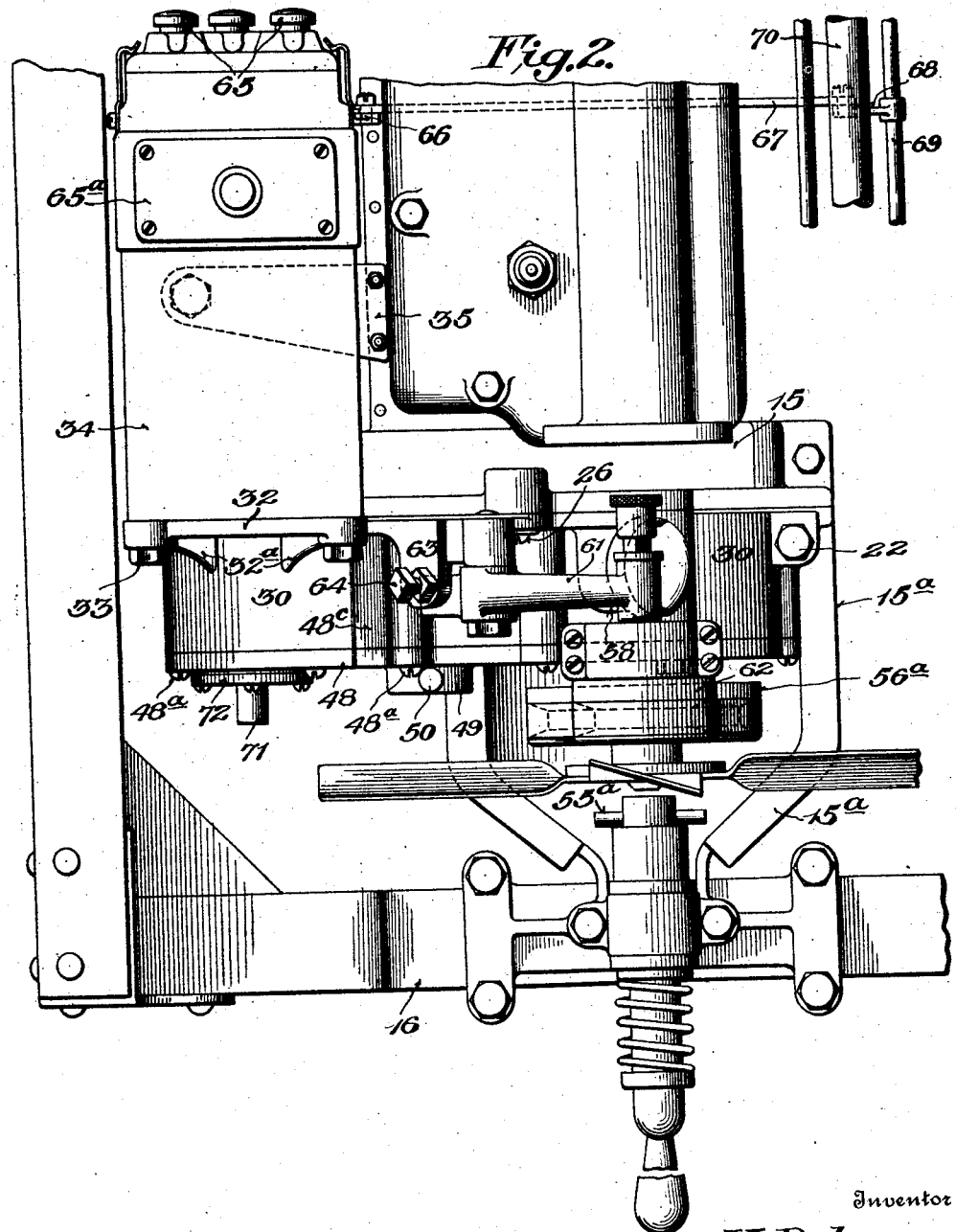
Fig. 2 is a plan of the same.
Figure 3:
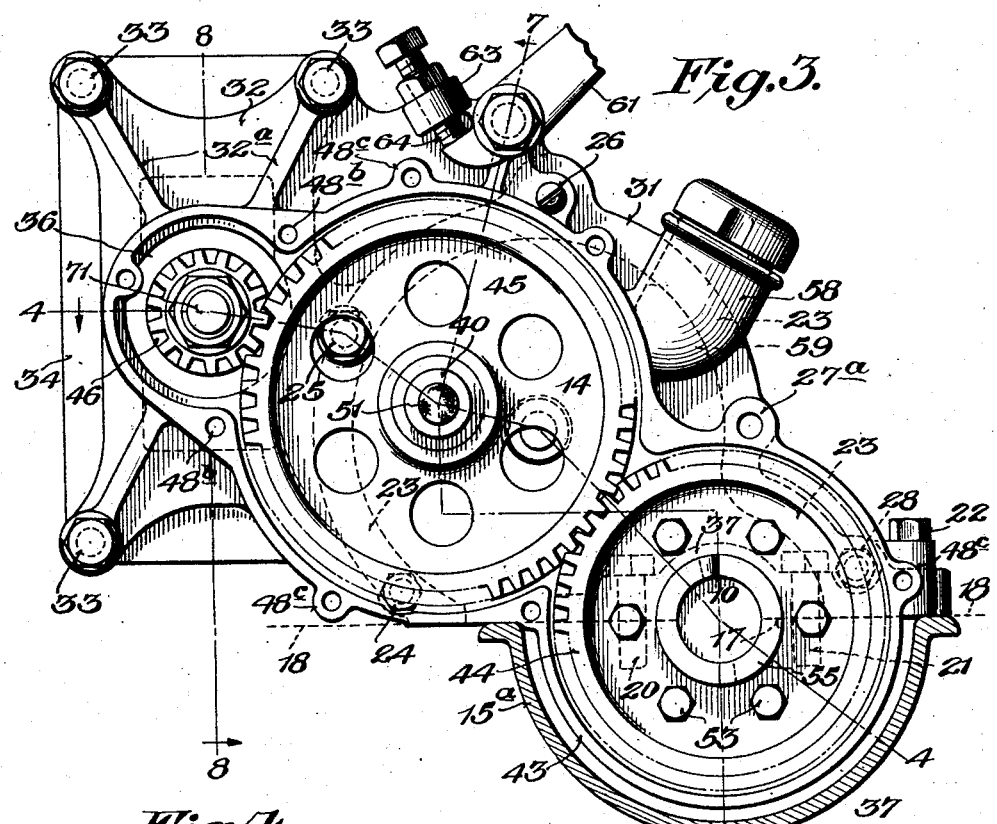
Fig. 3 is a detail front view, on a larger scale, partly in section, showing the combined timing cover plate and drive train housing with its cover removed.
Figure 4:
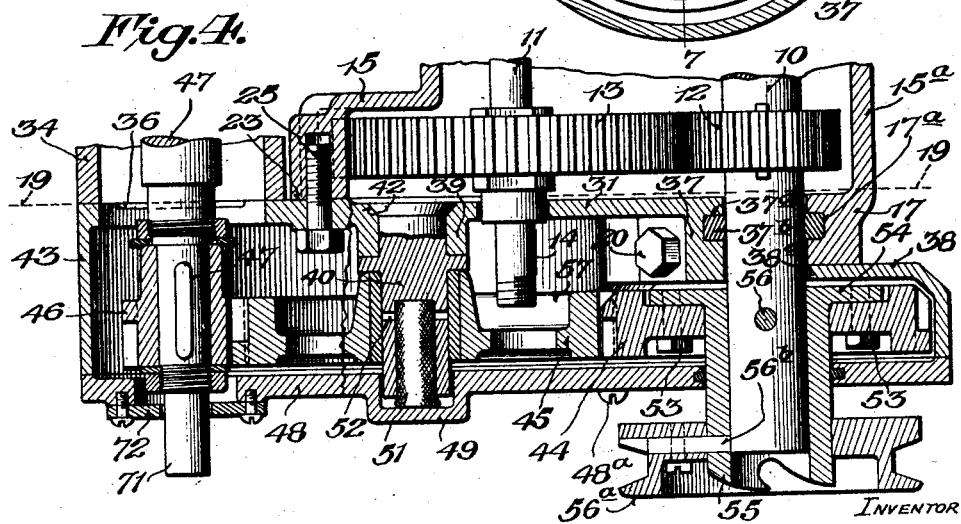
Fig. 4 is a developed section on the irregular line 4—4 of Fig. 3.

Referring to the drawings, Figs. 1 to 4 show more or less conventionally the forward portion of a Ford automobile engine installation modified to embody the construction of the present invention. The engine crank shaft is indicated at 10, the half-time or cam shaft at 11, and the timing gears at 12, 13. The Ford commutator, normally mounted on the front end 14 of the cam shaft, has been removed; but in the particular construction here illustrated, the shaft itself remains unaltered. The time gears are enclosed, except at the front, partly by the housing 15, and partly by the crank case 15ᵃ, which latter extends forwardly to form a characteristic trough-like nose supported on the front cross-member 16, of the vehicle frame, as shown. At 17, this forward extension of the crank case is formed with a heavy transverse partition or cross-piece which serves as a step or pillow block to carry the crank shaft. The horizontal upper face of this block, lying substantially in plane 18—18, is machined smooth to receive a cap member, and is tapped with two bolt holes on each side of the shaft, three of the four holes being here shown engaged by hold-down bolts 20, 21 and 22. The front edges 23 of the upper part of the housing 15, indicated in dotted outline in Fig. 3, are faced smooth and are tapped with bolt holes, here shown engaged by cap bolts 24, 25, screw 26, and cap bolts 27 and 28. In the standard Ford construction, a cover plate machined to seat on the front edges 23 of the crank case, and having a step or shoulder faced on its lower edge to cap the block 17 and to cooperate therewith in holding the crank case, is secured to said block and to the housing 15 by means of bolts passing through holes respectively registering with the tapped holes above mentioned. Said cover plate, which thus forms a front closure for the time gears in the standard Ford construction, is also apertured to permit the cam shaft to project therethrough, a commutator being mounted on the projecting end of the shaft and being connected in the ignition system by suitable leads. With this preliminary explanation, the construction characterizing the present invention, and its relation to the original standard Ford construction will be more readily understood.

In the embodiment of the invention here illustrated, the Ford commutator or timer is removed, together with the above described standard cover plate for the time gears, said cover plate being replaced by a casing which constitutes a combined time gear cover plate, drive gear housing and motor support, said casting being indicated generally by reference numerals 30 in Fig. 2. This casting will now be described in some detail, in conjunction with the other features of the invention. The attachment comprises a plate 31, apertured at 31ᵃ to fit over the forward end of the cam shaft and having on its rear side an accurately faced boss 23ᵃ, adapted to seat upon the front edges 23 of the crank case, and to be secured thereto by the aforesaid means 24, 25, 26, 27, 28, which extend through holes 24ᵃ, 25ᵃ, 26ᵃ, 27ᵃ, 28ᵃ, respectively, formed in the plate and registering with the original bolt holes in the time gear housing 15. The plate 31, which thus forms a cover plate for the time gears, has a laterally and upwardly extending portion 32, provided with stiffening webs 32ᵃ and constituting a bracket member, to which is rigidly secured, as by bolts 33, a dynamo electric machine 34.

Additional supporting means, such as bracket 35 secured to the under side of the housing and to the engine housing, may be provided. The plate is apertured as indicated at 36, to accommodate the end of the electric machine housing. At 37, the plate 31 is shouldered or extended forwardly in a relatively thick section to form a step adapted to fit over the engine crank shaft and to seat upon and cap the step 17 before described, hold-down bolts 20, 21, and 22, extending through bolt holes 20ª, 21ª, and 22ª respectively, and entering the corresponding holes provided in the step 17. The bearing recess of step 37 is provided with a groove 37ª, co-operating with groove 17ª in the lower step to receive packing 37ᵇ. Below the ledge or step 37, the casting continues as a smaller plate 38, parallel to the main plate 31 and arranged to extend downwardly just in front of the partition member 17 into the space provided by the dished forward extension of the crank case, the opening 38ª being provided to accommodate the crank shaft.

The plate 31 is also provided with a forwardly extending hollow boss 39 which serves to support a stud 40. The stud is shouldered at 41 to engage the outer edges of the boss 39, and is riveted over or upset in the countersink at the rear of the plate as indicated at 42.

Extending forwardly from the cover plate 31, and its extensions 32, 38, is a flange 43, which most desirably conforms approximately in outline to the drive gear train connecting the engine crank shaft with the armature shaft of the dynamo electric machine, and here shown as comprising pinion 44 connected to the crank shaft, idler 45 revoluble on stud 39, and pinion 46 which is fast with the armature shaft 47. As here shown, the gears of this driving train are provided with spiral teeth, but any other suitable type of gearing may be used. A cover plate 48 should ordinarily be provided to close the housing 43 at the front, being suitably secured thereto as by machine screws 48ª which are received in suitable internal bosses 48ᵇ and external bosses 48ᶜ on the housing, and also by the bolt 27, which extends through the external boss 27ª and plate 31 into one of the bolt holes in the time gear housing 15. In the construction illustrated, the stud 40 projects slightly beyond the front of the housing 43 and is received in a hollow boss 49 provided on the cover plate, the cover plate keeping the idler on its stud. Lubrication of the idler bearing is provided for by an oiler 50, felt wick 51, and oil passages 52. In the specific construction here shown, the crank shaft pinion 44 is not secured directly to the crank shaft, but is fastened by bolts 53 to the flange 54 of the starting clutch sleeve 55. Said sleeve is pinned at 56 to the crankshaft, which has its outer end formed to receive the pin 55ª on the adjacent end of the starting crank. This permits starting the engine by hand in case of emergency. Fan drive pulley 56ª is pinned to the sleeve and to the crank shaft as indicated at 56ᵇ. It will be noted that the main part of the housing 43 is of such depth from front to rear, and that the driving gear train is so located at the forward part of the housing, that the projecting end 14 of the cam shaft is cleared by the idler pinion 45, which is suitably recessed for this purpose as indicated at 57, said idler pinion being eccentrically located with respect to the cam shaft. Any suitable driving ratio between the engine crank shaft and the armature shaft may be employed, but in the present example the pinion 44 has 48 teeth, and the pinion 46 has 16 teeth, the driving ratio being therefore 3 to 1. For the sake of simplicity it is desirable to avoid the use of change speed gear reduction between the dynamo and the crank shaft, and in the arrangement here illustrated, the driving ratio remains fixed. Suitable means are provided to prevent excessive charging of the storage battery when the dynamo is being driven as a generator at high engine speeds; but as such means are now well understood in the art and since their specific character forms no part of the present invention, it is unnecessary to show or describe the same here. It is sufficient to state that the dynamo is connected by suitable leads to a storage battery located in any convenient position on the motor vehicle, appropriate switches and controlling mechanism of any well known or suitable character being provided to control the circuit connections.

It will be noted that the principal part of the described attachment substituted for the timing gear cover of the standard Ford car construction consists of a single casting constituting both a cover for the engine time gears and a receptacle for the gear train connecting the crank shaft with the armature shaft of the starting and lighting unit. The front cover for the gear train, though ordinarily employed in practice, is not an indispensable adjunct, broadly speaking. While it is very desirable from the standpoint of convenience and simplicity thus to employ a single casting, it is evident that within the scope of the invention, it could be replaced by an assemblage of separate parts, though less advantageously. The unitary construction herein described is to be especially recommended because it makes it possible to apply a starting and lighting system to the standard Ford car construction, or other construction of the general type in question, with almost no change in said construction, with extremely little trouble, and with the assurance of accurate and proper relation of the parts in the resultant modified construction. In this connection it is to be noted that the casting for the combined timing gear cover and drive train housing in the particular apparatus shown in the drawings, also includes the breather tube 58, which is the same in all essential respects as the breather tube carried by the regular Ford timing gear cover, but differently located for the sake of convenience. The breather tube communicates with the interior of the time gear housing 15 through an opening in plate 31, as indicated at 59, in Fig. 5. The casting also comprises the hollow boss 60 providing a pivotal support for the bracket 61 carrying the fan shaft and pulley 62, as well as the tapped lug 63 in which the fan bracket adjustment screw 64 works. The bosses 60 and 63 are in the same position relatively to the other parts of the installation as in the standard Ford construction.

In view of the fact that the Ford commutator or ignition timer is removed in effecting the starting and lighting installation above described, means must be provided for taking care of the engine ignition, either by making use of the ignition system previously on the vehicle, or otherwise. In the present example, the ignition system is energized from the storage battery mains, current going from the mains to the primary winding of a spark coil or transformer, and thence through an interrupter, the resultant high tension current induced in the secondary of the coil being directed by suitable distributing mechanism to the engine spark plugs by way of high tension terminals 65 and suitable connecting leads, in a manner well understood in the art. It is therefore unnecessary to illustrate here the details of such system; but it may be noted that in the particular arrangement here illustrated by way of example, the sparking coil or transformer is housed at 65$^a$ on the dynamo electric machine; while the distributer and interrupter mechanism is geared directly to the rear end of the armature shaft in such manner as to be driven at a speed equal to one-half that of the engine crank shaft. This arrangement being also now well known in the art, requires no specific illustration here. The spark advance lever 66 is connected by a link 67 to arm 68 on the spark control or lead rod 69, the steering post being indicated at 70. It is to be noted at this point that the starting and lighting unit 34 is mounted on the side of the machine opposite to that occupied by the driver. This is an important consideration in the case of a light car like a Ford, where the installation of a starting and lighting system on the same side of the vehicle as the driver is apt to seriously disturb the balance.

In some cases it may be preferred to drive the distributing and interrupting mechanism from the forward end of the dynamo motor shaft. In the present example, therefore, the armature shaft is provided with a forward extension 71 which projects through a small cover plate 72 secured to the main cover plate 48. This is obviously not an essential feature of the construction. Neither is it essential that the interrupter and distributer be geared to the armature shaft, as any other method of driving the same in proper synchronism with the crank shaft may be employed. For example, they may be driven from the end 14 of the cam shaft by means of suitable transmission mechanism geared thereto and extending through the gear housing between plate 31 and the drive gear train, it being possible in this arrangement either to use the removed commutator in conjunction with other parts of the Ford ignition system, or to employ any suitable type of current interrupting and distributing device connected to the storage battery mains. Driving the movable parts of the ignition system from the half-time shaft of the engine has the advantage that it renders the ignition timing entirely independent of the driving connection between the crank shaft and the dynamo electric means, thus making it possible to remove the latter and replace it without in any way disturbing the proper timing of the ignition system.

The invention is not limited to any particular type of dynamo electric machine, and the system may be either simply a starting system or a lighting system, or a combined starting and lighting system such as herein disclosed. The combined system may comprise a single dynamo electric machine of the type here illustrated, or it may comprise a twin unit system of the character disclosed in my co-pending application Ser. No. 22,084, filed April 17, 1915, wherein two dynamo electric machines housed in a unitary construction, are geared in tandem to the crank shaft, through idler 45 in the present instance, both machines cooperating to exert torque on the crank shaft when starting, but only one of the machines operating after the engine attains speed. Or it may comprise two separate machines one a generator and the other a motor, both geared directly to the idler 45, the arrangement being such that the motor is disconnected after the engine is speeded up. In such an arrangement, the motor may have a Bendix drive connection to the idler. The term dynamo electric means is employed herein to designate broadly the employment of one or more dynamo electric machines, of any desirable character and in any desired arrangement, in practicing the invention herein disclosed. Where any of these modified arrangements are employed, the shape and size of the described attachment is altered as may be necessary to support the parts. It may be noted here that the described attachment itself, apart from the mechanism associated therewith, constitutes an important novel feature of the invention, which therefore is not to be understood as limited to the complete combination set forth.

What I claim is:

1. The combination, with an internal combustion engine having a cam shaft and time gears whereby the cam shaft is driven from the engine crank shaft, of a cover plate for said time gears having an extension, a dynamo electric machine mounted on said extension, and driving connection between said machine and the engine crank shaft including a gear mounted eccentrically with respect to said cam shaft and overhanging the forward end thereof, said cover plate also providing housing means for said driving connection.

2. The combination with an internal combustion engine having a cam shaft, time gears whereby said cam shaft is driven from the engine crank shaft and casing means partially housing said time gears and provided with established points for attachment thereto of a cover, of a cover, dynamo electric means, a driving connection between said dynamo electric means and said crank shaft including a gear mounted on said cover out of alinement with said cam shaft and having a rim projecting rearwardly over the forward end of said cam shaft, said cover being arranged to support said dynamo electric means and to provide housing means for said driving connection and means utilizing at least some of the said established points of attachment in said casing for securing said cover to said casing means.

3. In an attachment for internal combustion engines, a combined cover plate and gear housing comprising a unitary casting faced on one side to engage and to close a time gear housing, and formed on the other side to house other gearing including a gear on the engine shaft, said casting being also provided with a step adapted to engage said engine shaft and to form a part of a bearing therefor.

In testimony whereof I hereunto affix my signature.

JAMES K. DELANO.